US008325173B2

(12) United States Patent
Lin

(10) Patent No.: US 8,325,173 B2
(45) Date of Patent: Dec. 4, 2012

(54) CONTROL METHOD FOR ELIMINATING DEFICIENT DISPLAY AND A DISPLAY DEVICE USING THE SAME AND DRIVING CIRCUIT USING THE SAME

(75) Inventor: Che-Li Lin, Taipei (TW)

(73) Assignee: Novatek Microelectronics Corp., Hsinchu (TW)

(*) Notice: Subject to any disclaimer, the term of this patent is extended or adjusted under 35 U.S.C. 154(b) by 1141 days.

(21) Appl. No.: 11/832,656

(22) Filed: Aug. 2, 2007

(65) Prior Publication Data

US 2008/0259061 A1 Oct. 23, 2008

(30) Foreign Application Priority Data

Apr. 18, 2007 (TW) ............................ 96113627 A

(51) Int. Cl.
*G06F 3/038* (2006.01)

(52) U.S. Cl. ......................... 345/211; 345/99; 345/204

(58) Field of Classification Search .................. 345/211, 345/52, 87, 99, 204, 212-214
See application file for complete search history.

(56) References Cited

U.S. PATENT DOCUMENTS

| | | | | |
|---|---|---|---|---|
| 6,154,561 | A * | 11/2000 | Pratt et al. | 382/141 |
| 6,636,206 | B1 * | 10/2003 | Yatabe | 345/204 |
| 2005/0007392 | A1 * | 1/2005 | Kasai et al. | 345/690 |
| 2005/0259090 | A1 * | 11/2005 | Wang et al. | 345/204 |
| 2006/0158407 | A1 * | 7/2006 | Chen et al. | 345/87 |
| 2008/0100558 | A1 * | 5/2008 | Yu | 345/100 |

FOREIGN PATENT DOCUMENTS

| | | |
|---|---|---|
| CN | 1487494 | 4/2004 |
| TW | 554322 | 9/2003 |
| TW | 200609868 | 3/2006 |
| TW | I251804 | 3/2006 |
| TW | I253037 | 4/2006 |
| TW | I254912 | 5/2006 |
| TW | I263962 | 10/2006 |
| TW | 200709132 | 3/2007 |

OTHER PUBLICATIONS

"Office Action of Taiwan Counterpart Application", issued on Aug. 25, 2011, p. 1-p. 10.

* cited by examiner

*Primary Examiner* — Amare Mengistu
*Assistant Examiner* — Stacy Khoo
(74) *Attorney, Agent, or Firm* — Jianq Chyun IP Office

(57) ABSTRACT

A control method for eliminating deficient display and a display device using the same and a driving circuit are provided herein. The display device includes a display panel, source driver, and a control device. The display panel includes a plurality of pixels. The source driver is used to provide a pixel voltage to the pixel. The control device determines whether to provide a first voltage to the pixels, and controls the source driver whether to provide the pixel voltage to the pixel, according to a control signal. When a system voltage of the display device is less than a predefined voltage, the control device controls the source driver to stop providing the pixel voltage to the pixel, and provides a first voltage to the pixel.

14 Claims, 18 Drawing Sheets

CONTROL METHOD FOR ELIMINATING DEFICIENT DISPLAY AND A DISPLAY DEVICE USING THE SAME AND DRIVING CIRCUIT USING THE SAME

CROSS-REFERENCE TO RELATED APPLICATION

This application claims the priority benefit of Taiwan application serial no. 96113627, filed Apr. 18, 2007. All disclosure of the Taiwan application is incorporated herein by reference.

BACKGROUND OF THE INVENTION

1. Field of the Invention

The present invention relates to a display device. More particularly, the present invention relates to a display device and a driving circuit using a control method for eliminating deficient display.

2. Description of Related Art

With the development of the optoelectronic and semiconductor technology, there is a rapid development in the field of panel displays. Among various kinds of panel displays, the thin film transistor liquid crystal displays (TFT-LCDs) having the features of high space utilization efficiency, low power consumption, no radiation and low electromagnetic interference become popular in the market recently. Since the TFT-LCD is widely used in the electronic products such as notebook computers, cell phones and televisions etc., improvement of the image quality is a constant goal in the field.

Generally, a special driving method can be applied for preventing an abnormal image display. For example, to avoid a residual image phenomenon occurred while the LCD panel is turned off, an all high function circuit is allocated in the gate driver for generating a control signal to control the gate driver outputting a high level to all scan lines, while the display panel is detected to be turned off. Therefore, all the thin film transistors corresponding to pixels or sub-pixels on the panel are synchronously turned on, so as to form a discharge path to accelerate the discharge of the capacitors of the pixels or sub-pixels, and eliminate the residual image phenomenon occurred while the display panel is turned off.

FIG. 1 is a block diagram of a gate driver of a conventional LCD. Referring to FIG. 1, the gate driver includes a shift register 101, a level shifter 102 and an output buffer 103. A timing controller (not shown) generates a vertical clock signal $V_{CLK}$ to control the state outputting time of each stages of shift register units in the shift register 101 for sequentially outputting an on/off logic states for each corresponding scan line. The level shifter 102 instantaneously converts the low voltage logic level to a high turn-on voltage and low turn-off voltage required for turning on/off of the film transistors on the panel. However, if the scan lines are driven directly by an output of the level shifter 102, the driving capability may be insufficient, therefore an output buffer 103 is added for increasing the driving capability.

In addition, a control signal OE is used for controlling the turn-on time of the film transistors. The signal XON is a control signal generated while the display panel is detected to be turned off, and the signal XON is used to control all of the output terminals $Y_1 \sim Y_n$ of the gate driver outputting a logic high level, in order to turn on all of the film transistors on the panel scan lines. Therefore, the signal XON is generally synchronous to a signal indicating that voltages are dropped, namely, if the system voltage is less than a predefined voltage while the display panel is turned off, the signal XON will be transmitted to the gate driver to accelerate the discharge of the capacitors of the pixels or sub-pixels in the panel.

FIG. 2 is a block diagram of a source driver of a conventional LCD. Referring to FIG. 2, the source driver includes a shift register 201, a line latch 202, a level shifter 203, a digital to analog converter 204, an output buffer 205, a data register 206 and a signal receiver 207, wherein the operation of the shift register 201, level shifter 203 and output buffer 205 has been described in FIG. 1, and the repeated description will be omitted hereby.

The signal receiver 207 receives a digital video data, and stores the digital video data in the data register 206. A timing controller (not shown) generates a horizontal clock signal $H_{CLK}$ to control the state outputting time of each stage of shift register units in the shift register 201 for sequentially storing all of the digital video data to be displayed on the scan line pixels in the line latch 202. The digital to analog converter 204 converts the digital video data into corresponding pixel voltages, in which a polarity signal (POL) inverses each time within each scan line cycle to inverse the output polarity of the adjacent scan lines, and the signal CLK1 is an control signal for controlling the output of the source driver.

In addition, the two ends of each switch in the first switching group 208 are respectively connected to an output terminal $X_1 \sim X_n$ of the source driver and a connecting terminal $Z_1 \sim Z_n$ of the panel data line, wherein the signal CON controls the on/off state of the first switching group 208 to output the pixel voltages to the panel data lines, therefore the signal CON can be the signal CLK1 or a signal synchronous with the signal CLK1.

According to the aforementioned description of the gate driver and the source driver, FIG. 3 is a block diagram of a conventional LCD, in which a plurality of source driver is coupled to the data lines of the LCD panel 303, and a plurality of gate driver is coupled to the scan lines of the LCD panel 303. For example, the connecting terminals 302 of the source drivers 301*a*, 301*b*, 301*c* shown in FIG. 3 are coupled to the data lines of the LCD panel 303, the output terminals 305 of the gate drivers 304*a* and 304*b* are coupled to the scan lines of the LCD panel 303. The timing controller 306 provides control signals CLK1 and POL to the source drivers 301*a*, 301*b*, 301*c*. A voltage detector 307 is used for detecting the system voltage $V_{system}$, and if the system voltage $V_{system}$ is less than a predefined voltage, a control signal XON is provided to control the output terminals 305 of the gate drivers 304*a* and 304*b* outputting a high level, so as to turn on all the film transistors on the scan lines of the LCD panel 303 to accelerate the discharge of the capacitors of the pixels or sub-pixels in the LCD panel 303.

However, while all the film transistors are turned on, the source drivers maybe still connect to the data lines, and each outputting level of the source drivers maybe has a different state (or level), this may cause a block mura phenomenon on the LCD panel when the LCD panel is turned off. FIG. 4 is a timing diagram of the correlative control signals of a source driver and a gate driver. Referring to FIG. 4, if the system voltage $V_{system}$ is less than a predefined voltage (i.e. the display panel is turned off), the output terminals $Y_1 \sim Y_n$ (shown as FIG. 1) of the gate driver synchronously output a high level (shown as block 402). Since the control signals CLK1 and POL for controlling the output of source drivers are respectively in an unknown state 403 and 404, wherein the control signal CLK1 (described as FIG. 2) also controls the switch of the first switching group 208, therefore the connecting terminal $Z_1 \sim Z_n$ of the source drivers are also in an unknown state 401. In other words, when all the film transistors on the panel scan lines are turned on, different voltage of each data line will cause a corresponding different discharging speed of the capacitors of the pixels or sub-pixels on the panel, and accordingly, a block mura phenomenon occurs when the display panel is turned off.

SUMMARY OF THE INVENTION

The present invention is direct to a control method for eliminating deficient display and a display device using the same. First, a system voltage of the display device is detected, when the system voltage is less than a predefined voltage, the supplying of pixel voltages to a plurality of pixels of the display device is stopped, and another voltage is provided to the pixels, such that the block mura phenomenon caused by different discharge speed of the pixel capacitors is avoided and the image quality is improved.

The present invention is direct to a display device having a control method for eliminating deficient display. The display device includes a display panel, source drivers and a control device. The display panel comprises a plurality of pixels. The source drivers are used for providing pixel voltages to the pixels. The control device is used for receiving a control signal and determining whether to provide a first voltage to the pixels, and determining the source drivers whether to provide the pixel voltages to the pixels, according to the control signal. When a system voltage of the display device is less than a predefined voltage, the control device controls the source drivers to stop providing the pixel voltages to the pixels, and provides a first voltage to the pixels.

In an embodiment, a control device of the aforementioned display device includes a plurality of switching module, a first connecting line and a signal generation circuit. Each switching module includes a first output terminal, a second connecting terminal, a first connecting terminal, a first switch and a second switch. The first output terminal receives the pixel voltages from the source drivers. The first connecting terminal is coupled to the pixel. The first switch is turned on/off connection with the first output terminal according to a first control signal. The second switch is coupled to the first connecting terminal, and is turned on/off connection with the first switch or the second connecting terminal according to a second control signal. The first connecting line is coupled to a second connecting terminal of the switching module and is coupled to a first voltage. The signal generation circuit receives the control signal and generates a first control signal and a second control signal. When the system voltage is less than a predefined voltage, the first switch is turned off in response to the first control signal, and the second switch is turned on to connect with the second connecting terminal in response to the second control signal.

The present invention provides a control method for eliminating deficient display, suitable for a display device having source drivers and a plurality of pixels. First, a system voltage of the display device is detected, if the detected system voltage is less than a predefined voltage, the control device controls the source drivers to stop providing the pixel voltages to the pixels, and provides a first voltage to the pixels.

In an embodiment, a display device having the aforementioned control method includes a gate driver, and the control method further includes: controlling the gate driver to drive a plurality of scan lines when the system voltage is less than a predefined voltage.

According to the present invention, when a system voltage of the display device is detected to be less than the first voltage, namely, the display device is turned off, the gate driver turns on a plurality of scan lines in response to a control signal to discharge the pixel capacitors. Meanwhile, the source drivers stop providing the pixel voltages to the data lines in response to the control signal, and a voltage level is provided to the pixels on the data lines, so as to avoid the block mura phenomenon caused by different discharge speed of the pixel capacitors due to different voltage levels on the data lines of the display device.

The present invention provides a driving device for a display device. The driving device includes a source driver, configured to supply a plurality of pixel voltages to a plurality of pixels of a display panel in the display device; a control device, configured to receive a control signal and determine whether to provide a first voltage to the pixels, and determine the source driver whether to provide the pixel voltages to the aforementioned pixels, according to the control signal. Wherein when a system voltage of the display device is less than a predefined voltage, the control device controls the source driver to stop providing the pixel voltages to the pixels, and provides a first voltage to the pixels, so as to avoid the block mura phenomenon caused by different discharge speed of the pixel capacitors due to different voltage levels of the data lines on the display device.

In order to make the aforementioned and other objects, features and advantages of the present invention comprehensible, a preferred embodiment accompanied with figures is described in detail below.

DESCRIPTION OF EMBODIMENTS

The present invention provides a control method for eliminating deficient display of a display device. This control method can be applied in a timing controller, a driving method or a driving device etc. of the display device. In the method, a system voltage of the display device is detected. When the system voltage is less than a predefined voltage, supplying of pixel voltages to the pixels is stopped, and another voltage is provided to these pixels, such that the block mura phenomenon is avoided and the image quality is improved.

Figure 5A:
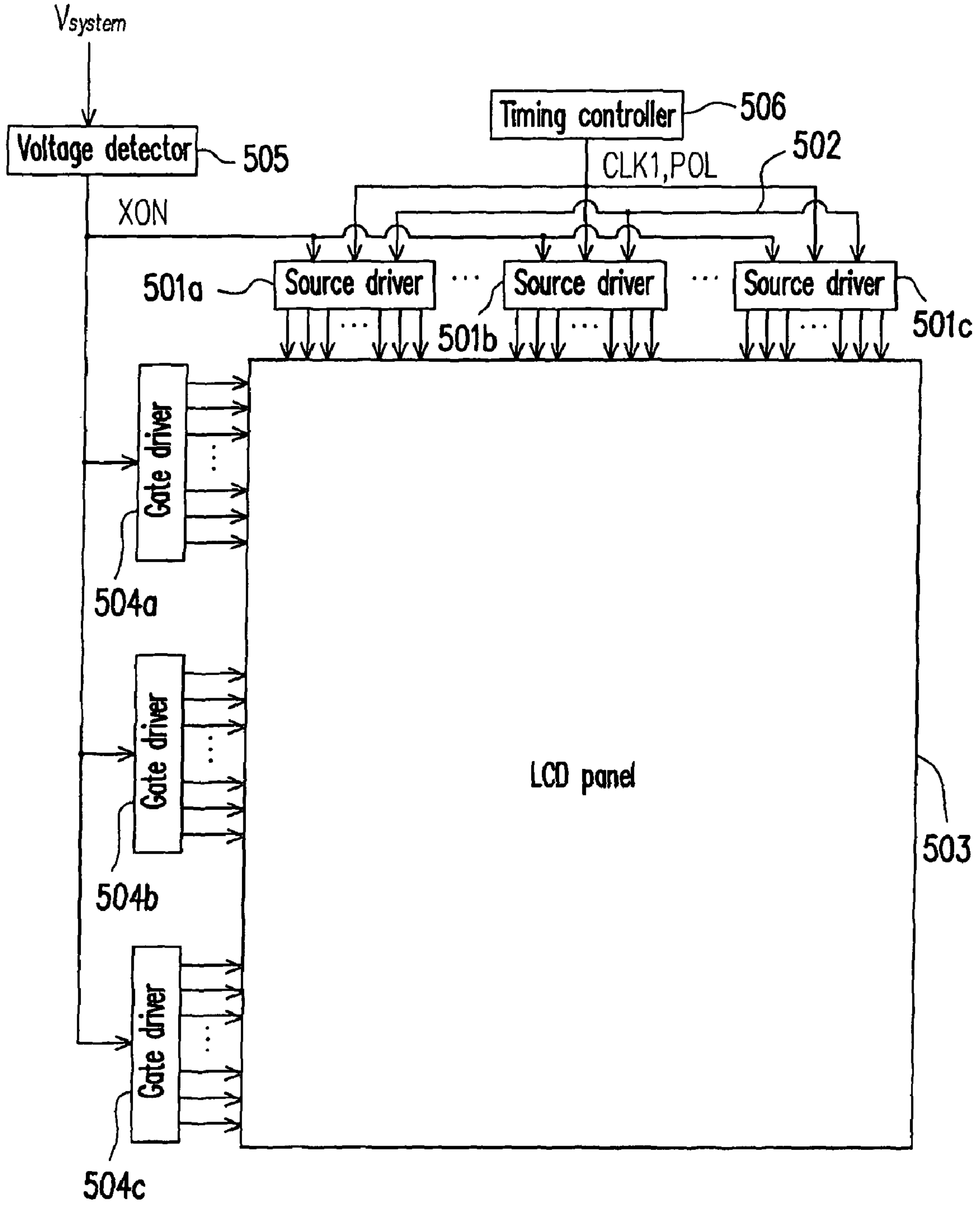
FIG. 5A is block diagram of a display device according to a preferred embodiment of the present invention.

FIG. 5A is block diagram of a display device according to an embodiment of the present invention. Referring to FIG. 5A, the display device includes source drivers 501*a*, 501*b* and 501*c* (three source drivers are illustrated as an example, but not limited thereto), gate drivers 504*a*, 504*b* and 504*c* (three gate drivers are illustrated as an example, but not limited thereto), a display panel 503, a voltage detector 505, a timing controller 506 and a control device (not shown). The display panel 503 includes a plurality of pixels.

The timing controller 506 provides clock signals for the operation of the display device. The clock signals include a vertical clock signal $V_{CLK}$, a horizontal clock signal $H_{CLK}$, a control signal OE for controlling the turn-on time of the thin film transistors (TFTs) on the display panel 503, a polarity control signal POL for inversing the output polarity of the adjacent scan lines, and a control clock signal CLK1 for controlling the output of the source drivers 501*a*, 501*b* and 501*c*.

The gate drivers 504*a*, 504*b* and 504*c* sequentially drive the scan lines of the display panel 503 according to the control clock signal provided by the timing controller 506. The source drivers 501*a*, 501*b* and 501*c* provide the pixel voltages to the pixels through data lines according to the control clock signal provided by the timing controller 506. The voltage detector 505 detects the system voltage $V_{system}$ of the display device. When the system voltage $V_{system}$ is less than a predefined voltage, the control device controls the source drivers 501*a*, 501*b* and 501*c* to stop providing the pixel voltages to the data lines, and provides a first voltage to the data lines, so as to avoid the block mura phenomenon caused by different discharge speed of the pixel capacitors. The operation of each block will be described in detail as blow.

Figure 2:
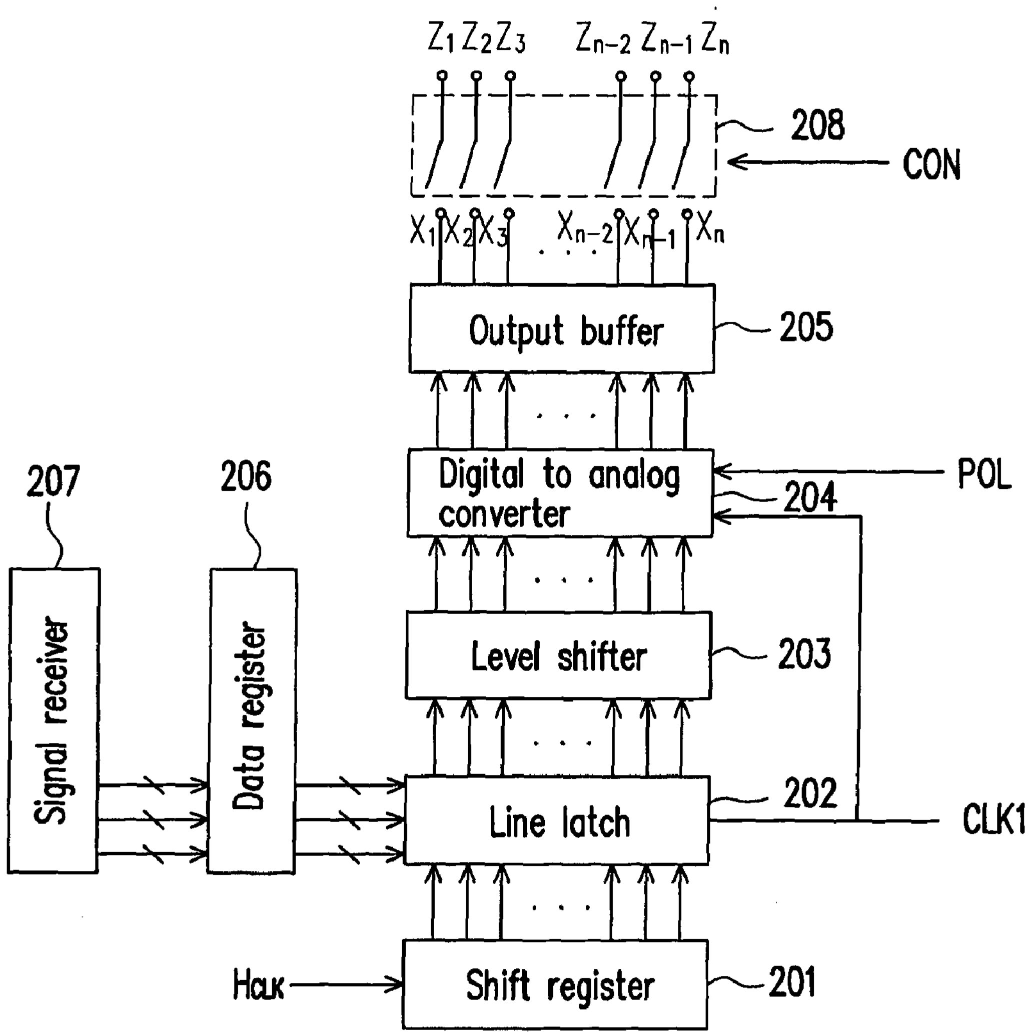
FIG. 2 (PRIOR ART)
FIG. 2 is a block diagram of a source driver of a conventional LCD.
Figure 3:
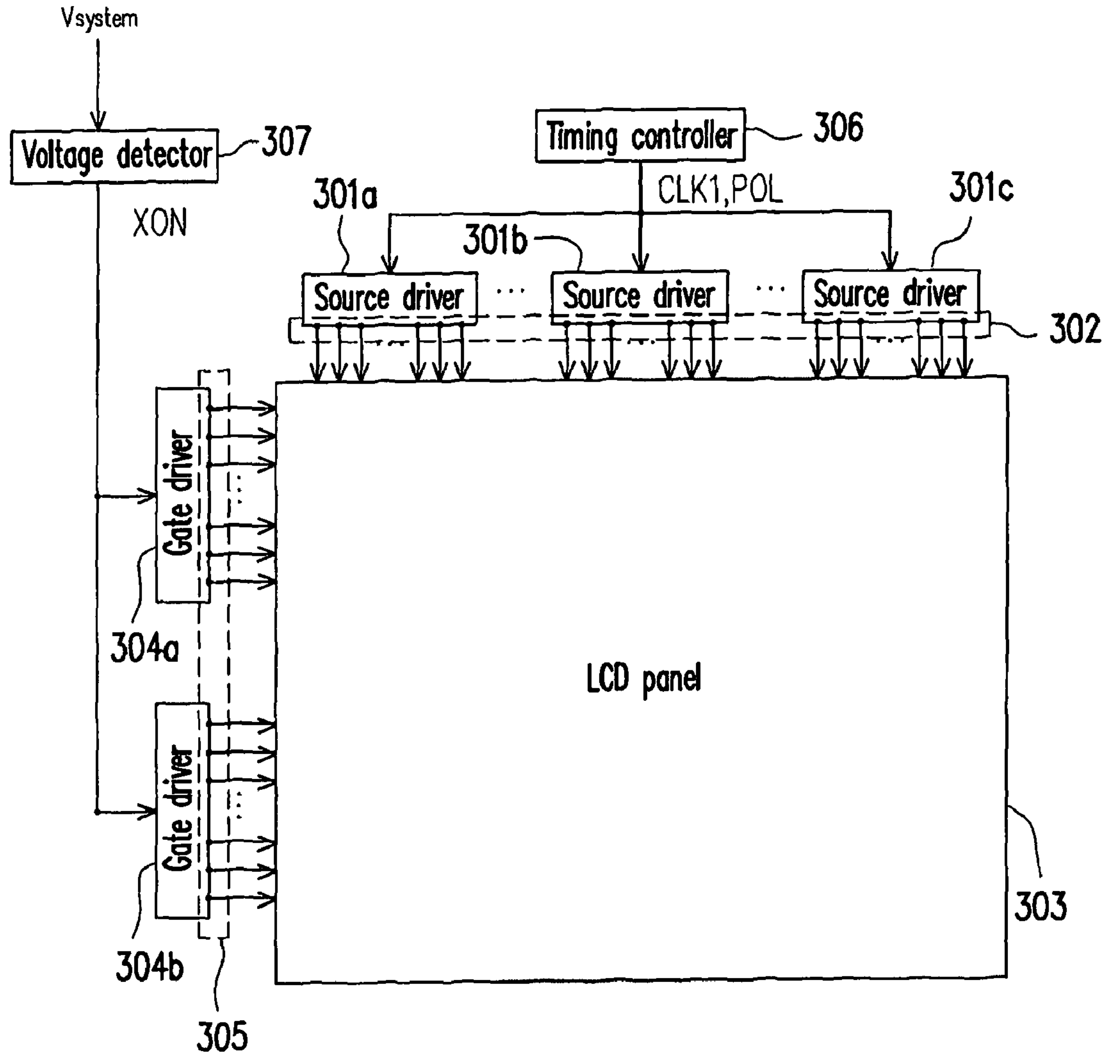
FIG. 3 (PRIOR ART)
FIG. 3 is a block diagram of a conventional LCD.
Figure 4:
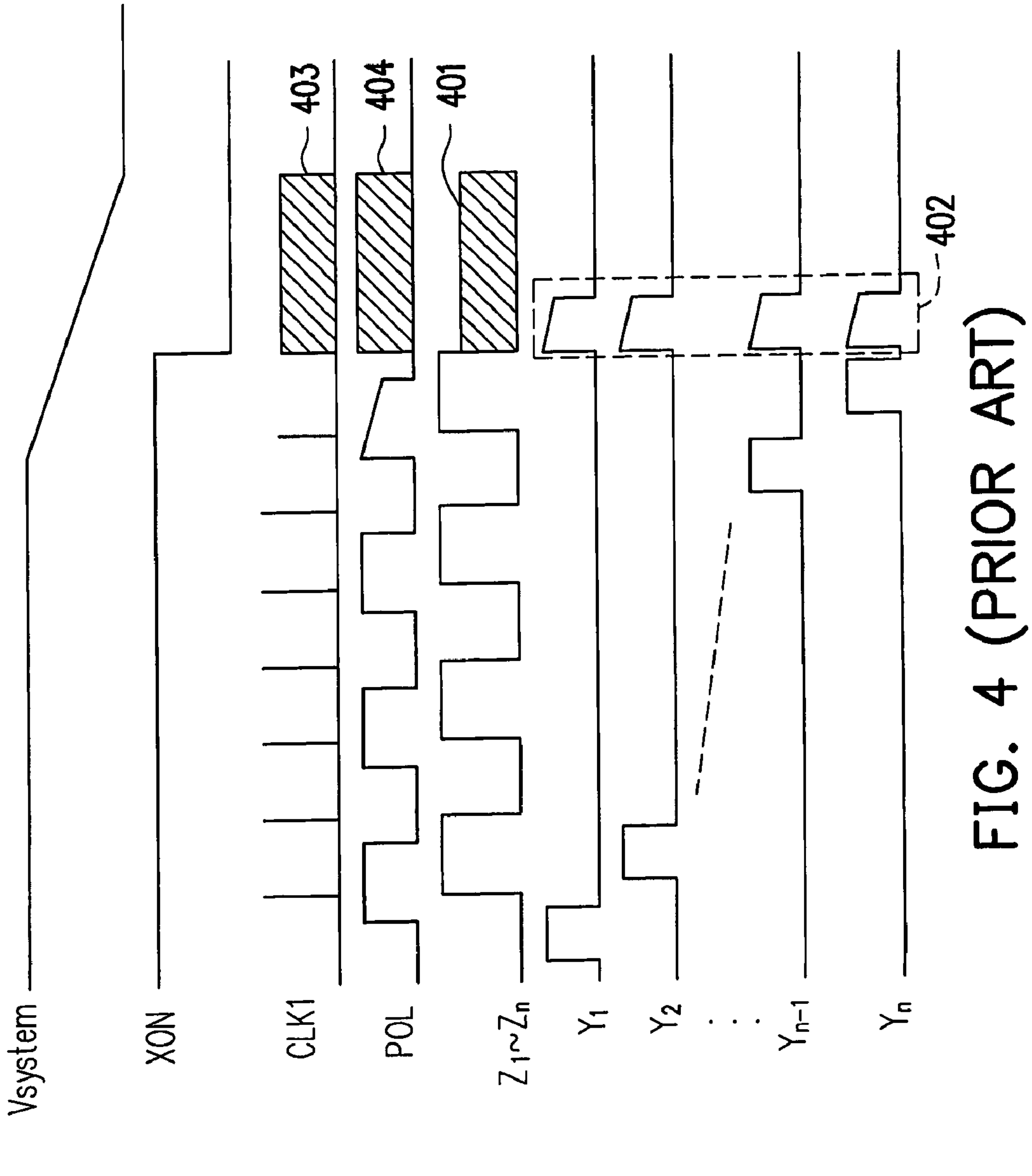
FIG. 4 (PRIOR ART)
FIG. 4 is a timing diagram of the correlative control signals of a source driver and a gate driver.
Figure 5B:
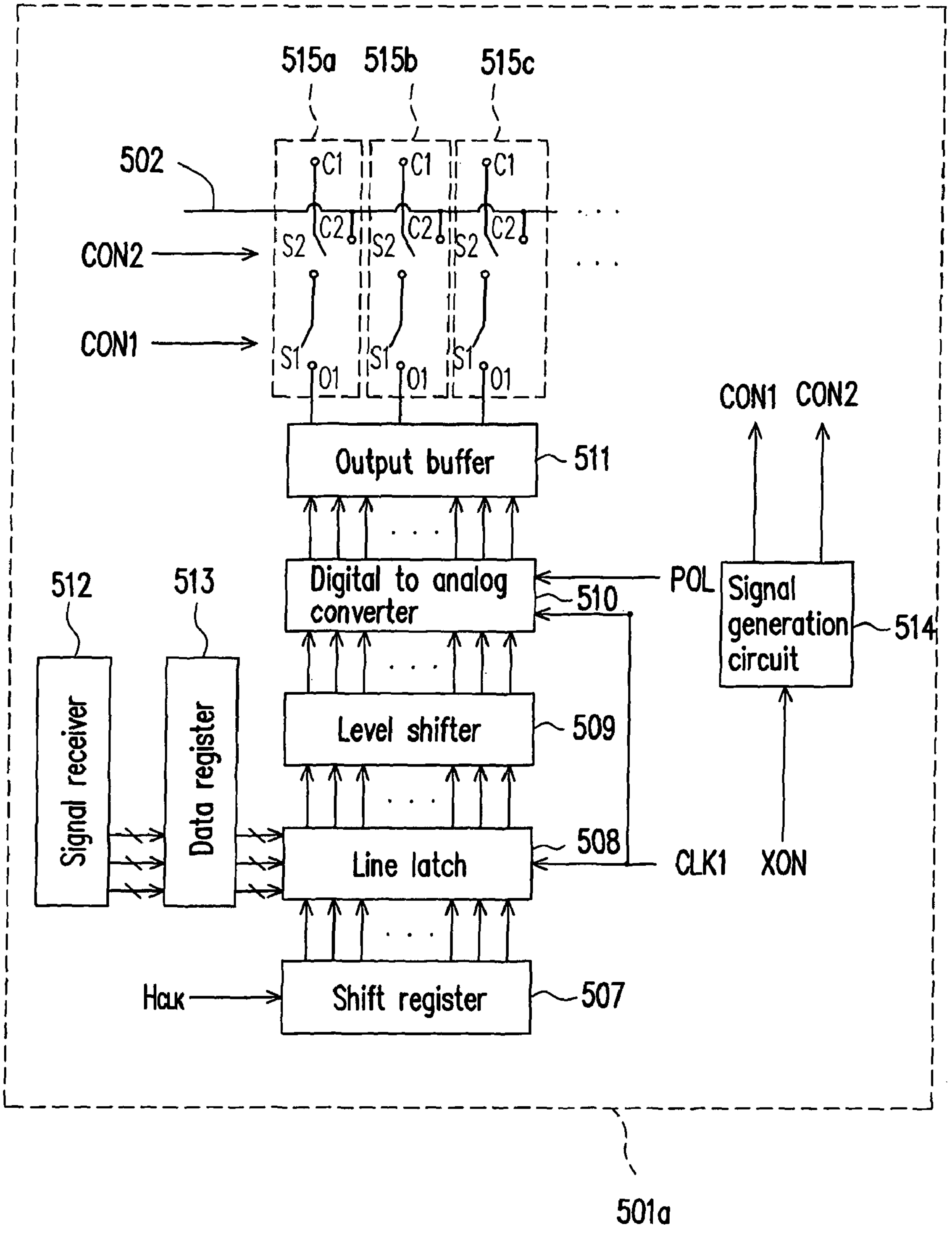
FIG. 5B is a block diagram illustrating an embodiment circuit of the source drivers of FIG. 5A.

Assuming the control device is allocated in the driving device, coupled between the source drivers and the pixels. FIG. 5B is a block diagram illustrating an embodiment circuit of the source drivers 501*a*, 501*b* and 501*c* shown in FIG. 5A (source driver 501*a* is taken as an example in the following description). Referring to FIGS. 5A and 5B, the operation of the shift register 507, line latch 508, level shifter 509, digital to analog converter 510, output buffer 511, signal receiver 512 and the data register 513 included in the source driver 501 have been described in the embodiment of FIG. 2, the repeated description will be omitted hereby.

The control device includes switching modules 515*a*, 515*b* and 515*c* (three switching modules are shown herein as an example, but not limited thereto, and the switching module 515*a* is taken as an example in the following description), a signal generation circuit 514 and a first connecting line 502. The switching module 515*a* includes a first output terminal O1, a first connecting terminal C1, a second connecting terminal C2, a first switch S1, and a second switch S2. The first output terminal O1 receives a pixel voltage from the source driver 501*a*, and the first connecting terminal C1 is coupled to the pixel. The first switch S1 is turned on/off connection with the first output terminal O1 according to a first control signal CON1. The second switch is coupled to the first connecting terminal C1, and is turned on/off connection with the first switch S1 or the second connecting terminal C2 according to a second control signal CON2. The first connecting line 502 connects the second connecting terminals C2 of the switching modules 515*a*, 515*b* and 515*c* together.

Figure 1:
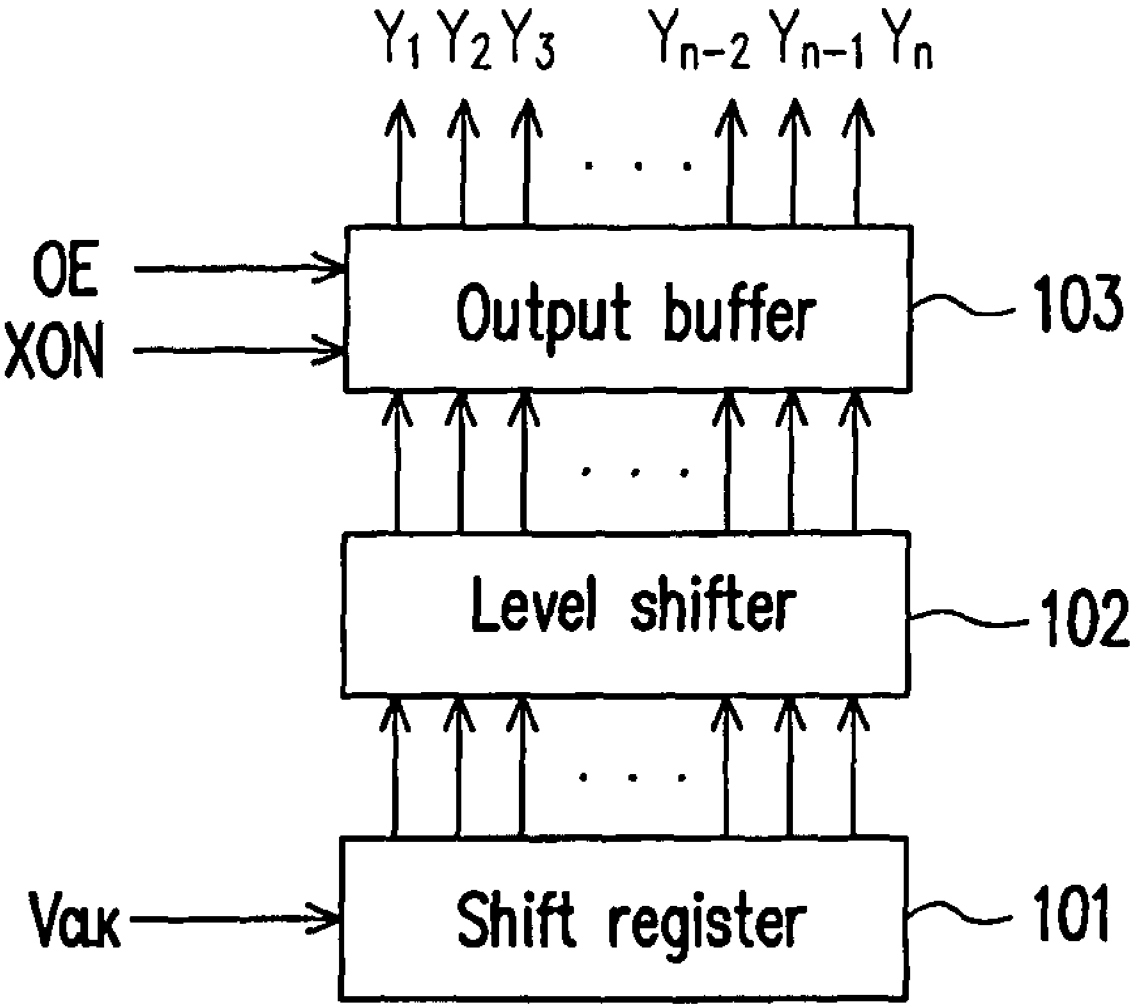
FIG. 1 (PRIOR ART)
FIG. 1 is a block diagram of a gate driver of a conventional LCD.
Figure 5C:
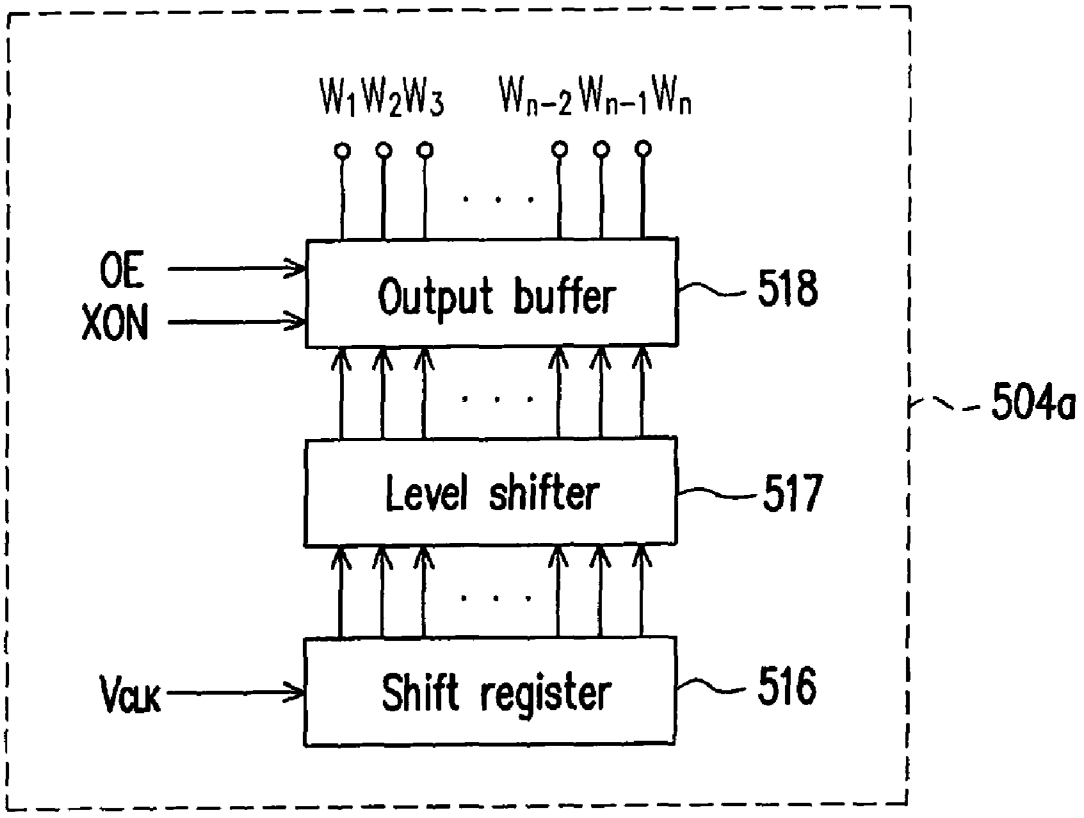
FIG. 5C is a block diagram illustrating an embodiment circuit of the gate drivers of FIG. 5A.

FIG. 5C is a block diagram illustrating an embodiment circuit of the gate drivers 504*a*, 504*b* and 504*c* of FIG. 5A. The gate driver 504*a* is taken as an example in the following description. Referring to FIGS. 5A and 5C, the operation of the shift register 516, the level shifter 517 and the output buffer 518 included in the gate driver 504*a* have been described above as in FIG. 1. The gate driver 504*a* includes the second output terminals $W_1$~$W_n$ respectively coupled to the scan lines of the display panel 503.

Figure 5D:
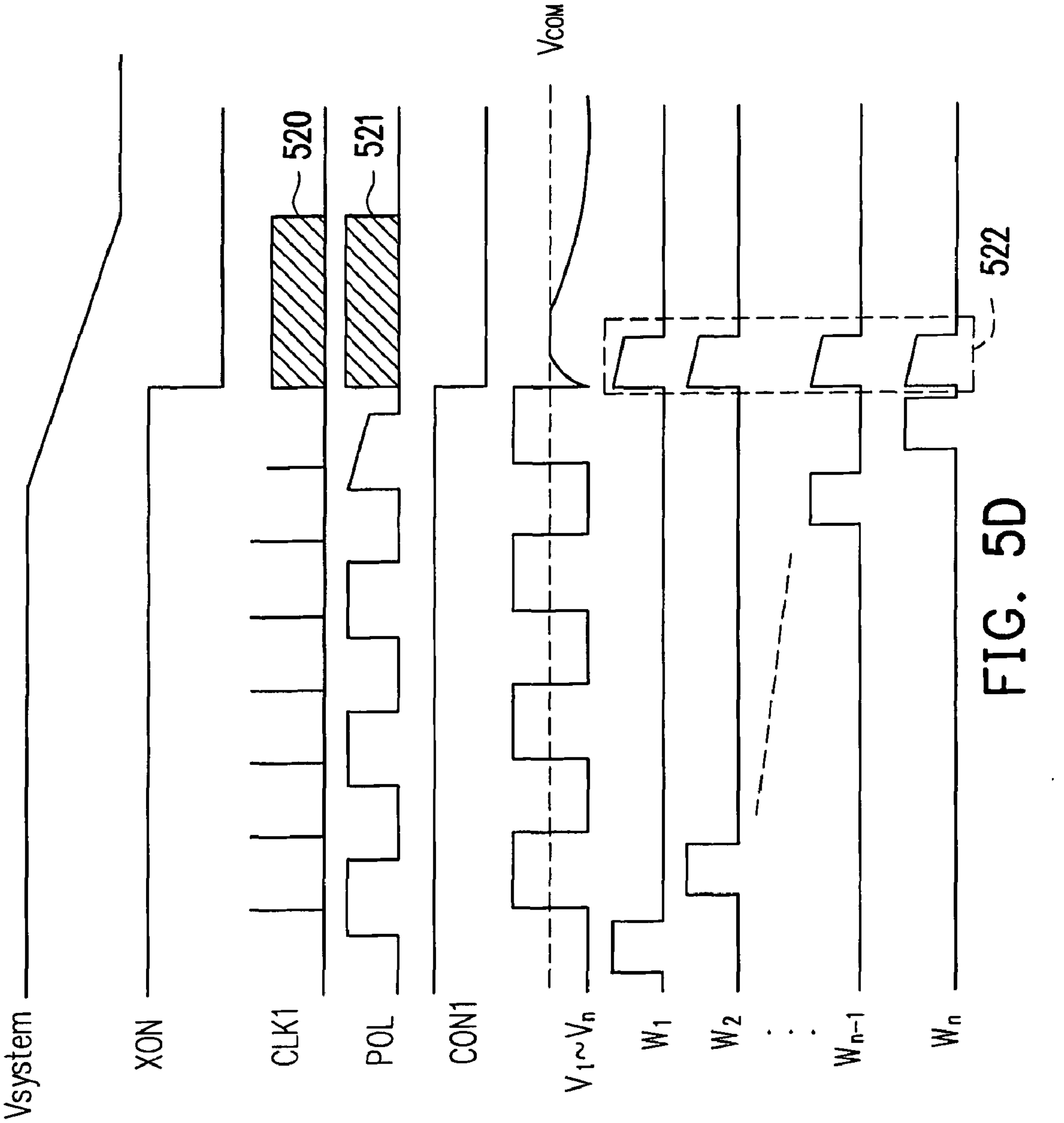
FIG. 5D is a timing diagram of the correlative control signals of a source driver and a gate driver according to a preferred embodiment of the present invention.

FIG. 5D is a timing diagram of the correlative control signals of a source driver and a gate driver according to an embodiment of the present invention. Referring to FIGS. 5C and 5D, when the voltage detector 505 detects that a system voltage $V_{system}$ is less than a predefined voltage, namely, the display device is in a turn-off state, the voltage detector 505 generates a control signal XON to control the gate drivers 504*a*, 504*b* and 504*c* turning on a plurality of scan lines on the display panel 503. In other words, the second output terminals $W_1$~$W_n$ output a high level (shown as block 522) to turn on the film transistors on the display panel 503, and provide a discharge path for the discharge of the capacitors of the pixels or sub-pixels on the display panel 503.

Referring to FIGS. 5B and 5D, meanwhile, though the control signals CLK1 and POL are respectively in an unknown state 520 and 521, the signal generation circuit 514 in the source driver 501*a* generates a first control signal CON1 and a second control signal CON2 while receiving the control signal XON. The first switch S1 cuts off the connection with the first output terminal O1 in response to the first control signal CON 1, the second switch S2 cuts off the connection with the first switch S1 and turns on the connection with the second connecting terminal C2 in response to the second control signal CON2.

In the present embodiment, the first connecting line 502 is coupled to a first voltage $V_{COM}$. Therefore, the first voltage $V_{COM}$ can be provided to the data lines $V_1$~$V_n$ of the display panel 503 when the display device is turned off, such that the voltage on each data line will be identical, and the block mura phenomenon caused by different discharge speed of the capacitors can be avoided. The first voltage $V_{COM}$ may be a common electrode voltage coupled to each pixel, therefore, when the display device is turned off, the voltage on the two electrodes of the pixel capacitor is respectively the first voltage and the common electrode voltage. In other words, there is a minimum charge stored in the pixel capacitors, and leads to a rapid discharge of the capacitors.

Figure 6A:
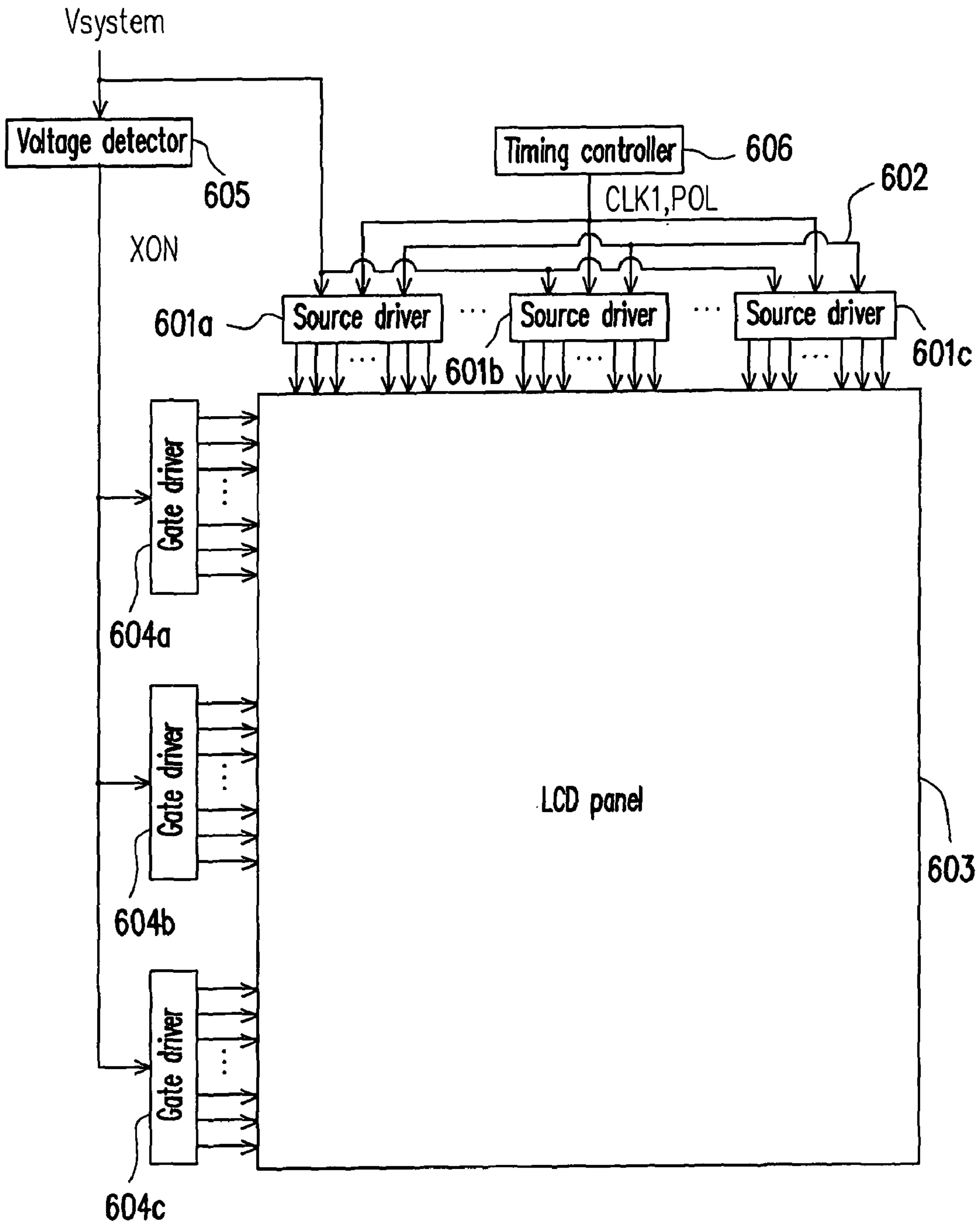
FIG. 6A is a block diagram of a display device according to a preferred embodiment of the present invention.
Figure 6B:
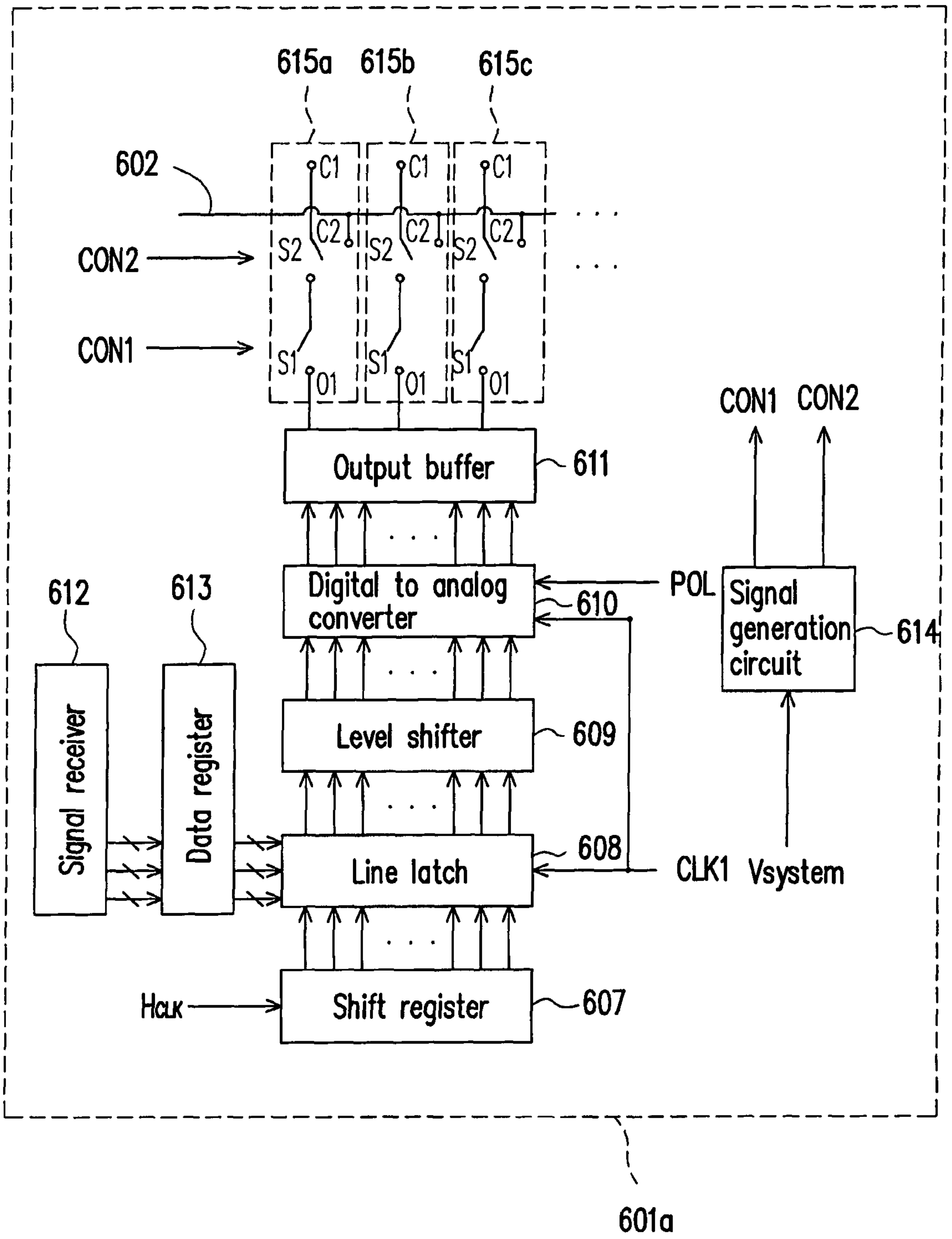
FIG. 6B is a block diagram illustrating an embodiment circuit of the source drivers of FIG. 6A.

FIG. 6A is a block diagram of a display device according to a preferred embodiment of the present invention. FIG. 6B is a block diagram illustrating an embodiment circuit of the source drivers 601*a*, 601*b* and 601*c* of FIG. 6A (only three source drivers are shown in FIG. 6A, and the source driver 601*a* is taken as an example in the following description). Referring to FIGS. 5A, 5B, 6A and 6B, the difference between the embodiment shown in FIGS. 6A and 6B and the embodiment shown in FIGS. 5A and 5B is that in the embodiment of FIGS. 6A and 6B, the source driver 601*a* receives the system voltage $V_{system}$, and the $V_{system}$ is detected by a signal generation circuit 614 in the source driver 601*a*.

Figure 6C:
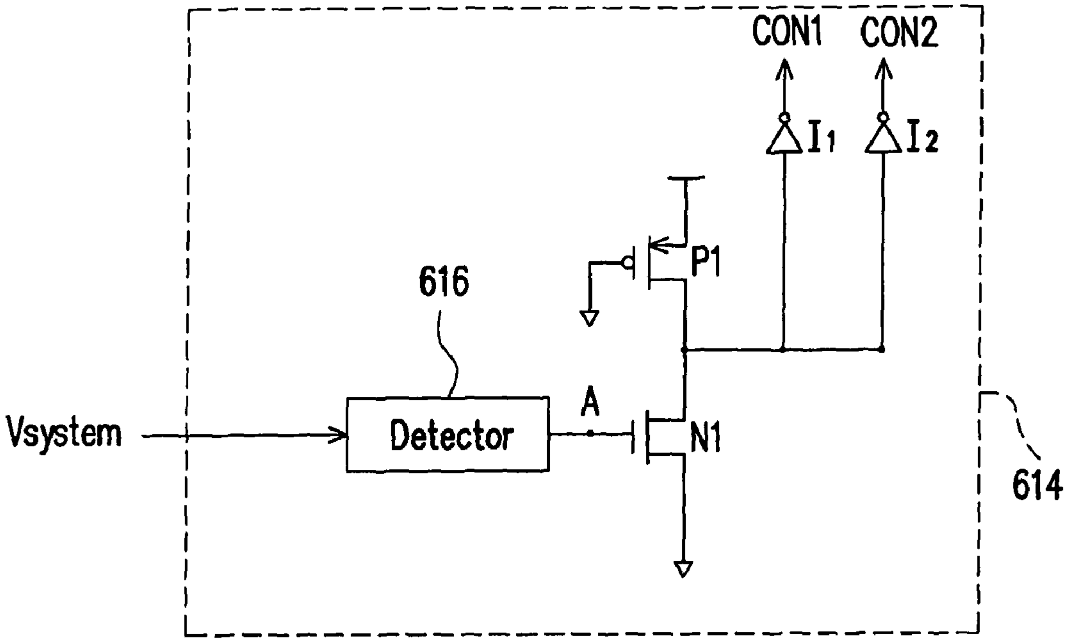
FIG. 6C is a circuit diagram of a generation circuit of FIG. 6B according to an embodiment of the present invention.

FIG. 6C is a circuit diagram of a generation circuit 614 of FIG. 6B according to an embodiment of the present invention. The signal generation circuit 614 includes a detector 616, a N-type transistor N1, a P-type transistor P1, a first inverter I1 and a second inverter I2. The detector 616 detects a system voltage $V_{system}$, and outputs an enable signal if the detected system voltage $V_{system}$ is less than a predefined voltage to turn on the transistor N1, meanwhile, outputs a first and a second control signals CON1 and CON2 through the first and second inverter I1 and I2.

Since the first connecting line 602 is coupled to all the second connecting terminals C2 of the switching modules in the source drivers 601*a*, 601*b* and 601*c*, and is coupled to a first voltage $V_{COM}$. Therefore, while the display device is turned off and all the scan lines are turned on, the first switch S1 cuts off the connection with the first output terminal O1 in response to the first control signal CON1, the second switch S2 turns on the connection with the second connecting terminal in response to the second control signal CON2, so as to provide a first voltage $V_{COM}$ to the data lines, such that the block mura phenomenon caused by different discharge speed of the capacitors can be avoided. Please refer to FIGS. 5A and 5B for the description of other operations of the circuit, the repeated description will be omitted hereby.

Figure 7A:
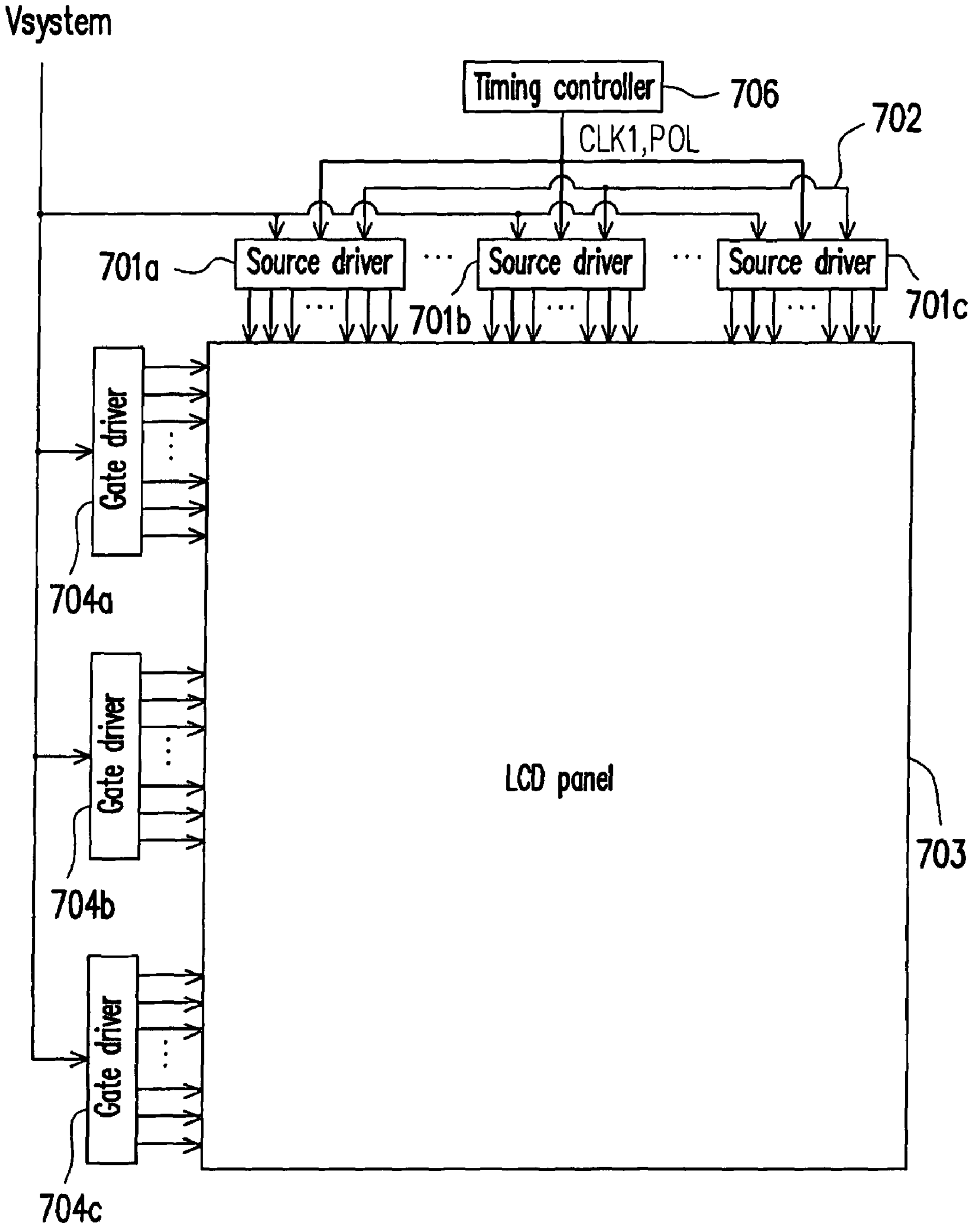
FIG. 7A is a block diagram of a display device according to a preferred embodiment of the present invention.

FIG. 7A is a block diagram of a display device according to a preferred embodiment of the present invention. Referring to FIG. 7A, the display device includes source drivers 701*a*, 701*b* and 701*c* (only three source drivers are shown), gate drivers 704*a*, 704*b* and 704*c* (only three gate drivers are shown), a timing controller 706, and a display panel 703.

Figure 7B:
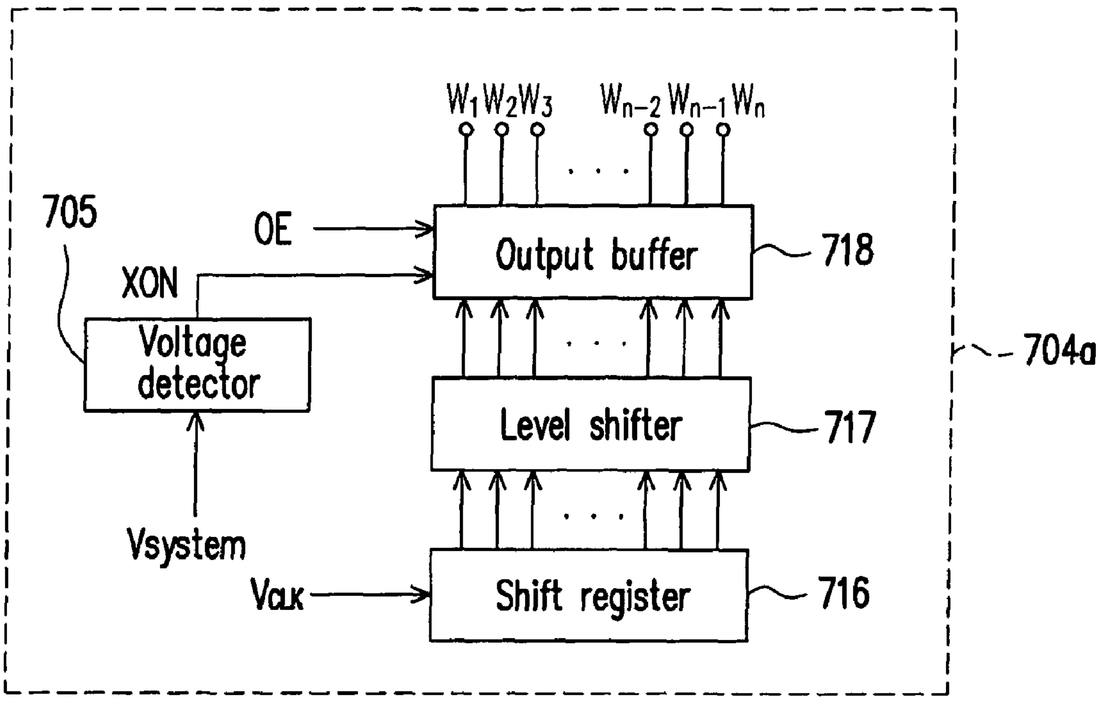
FIG. 7B is a block diagram illustrating an embodiment circuit of the gate drivers of FIG. 7A.

The source drivers 701*a*, 701*b* and 701*c* of the present embodiment are embodied by the source drivers shown in FIG. 6B. FIG. 7B is a block diagram illustrating an embodiment circuit of the gate drivers 704*a*, 704*b* and 704*c* of FIG. 7A. The gate driver 704*a* is taken as an example in the following description. Referring to FIGS. 7A and 7B, the operation of the shift register 716, level shifter 717 and the output buffer 718 included in the gate driver 704*a* have been described in the embodiment of FIG. 1.

In addition, the gate driver 704*a* includes second output terminals $W_1$~$W_n$ and a voltage detector 705. The second output terminals $W_1$~$W_n$ are respectively coupled to the scan lines of the display panel 703. The voltage detector 705 detects the system voltage $V_{system}$, and generates a control signal XON when the system voltage $V_{system}$ is less than a predefined voltage to control all the second output terminals $W_1$~$W_n$ outputting a high level, so as to turn on all the scan lines on the display panel 703.

Figure 8A:
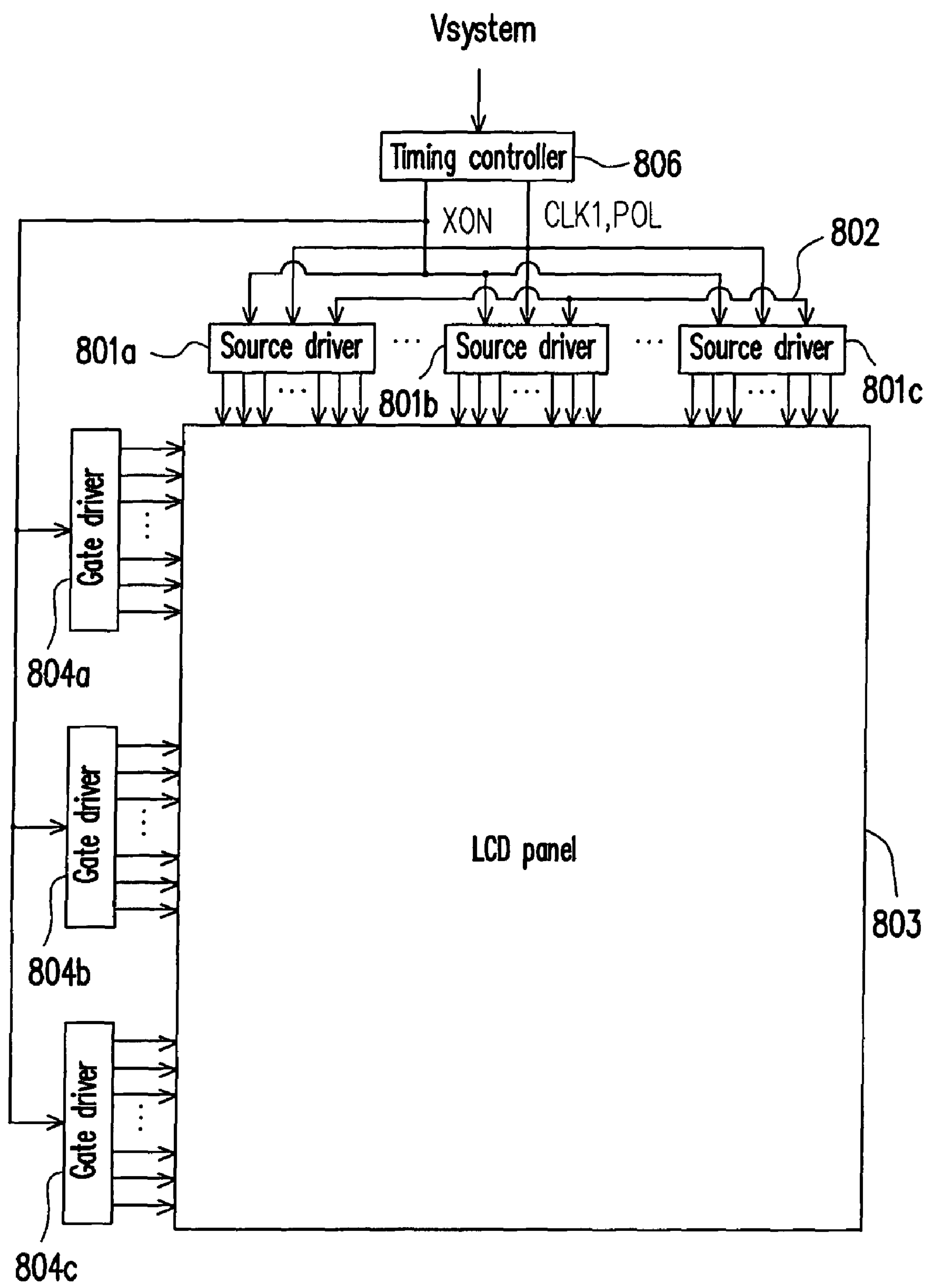
FIG. 8A is a block diagram of a display device according to a preferred embodiment of the present invention.

FIG. 8A is a block diagram of a display device according to a preferred embodiment of the present invention. Referring to FIG. 8A, the display device includes source drivers 801*a*, 801*b* and 801*c* (only three source drivers are shown), gate drivers 804*a*, 804*b* and 804*c* (only three gate drivers are shown), a display panel 803 and a timing controller 806. The source drivers 801*a*, 801*b* and 801*c* of the present embodiment are embodied by the source drivers shown in FIG. 5B, and the gate drivers 804*a*, 804*b* and 804*c* of the present embodiment are embodied by the gate drivers shown in FIG. 5C. In the present embodiment, the timing controller 806 is used not only for providing a clock control signal for the operation of the display device, but also using for detecting the system voltage $V_{system}$.

Figure 8B:
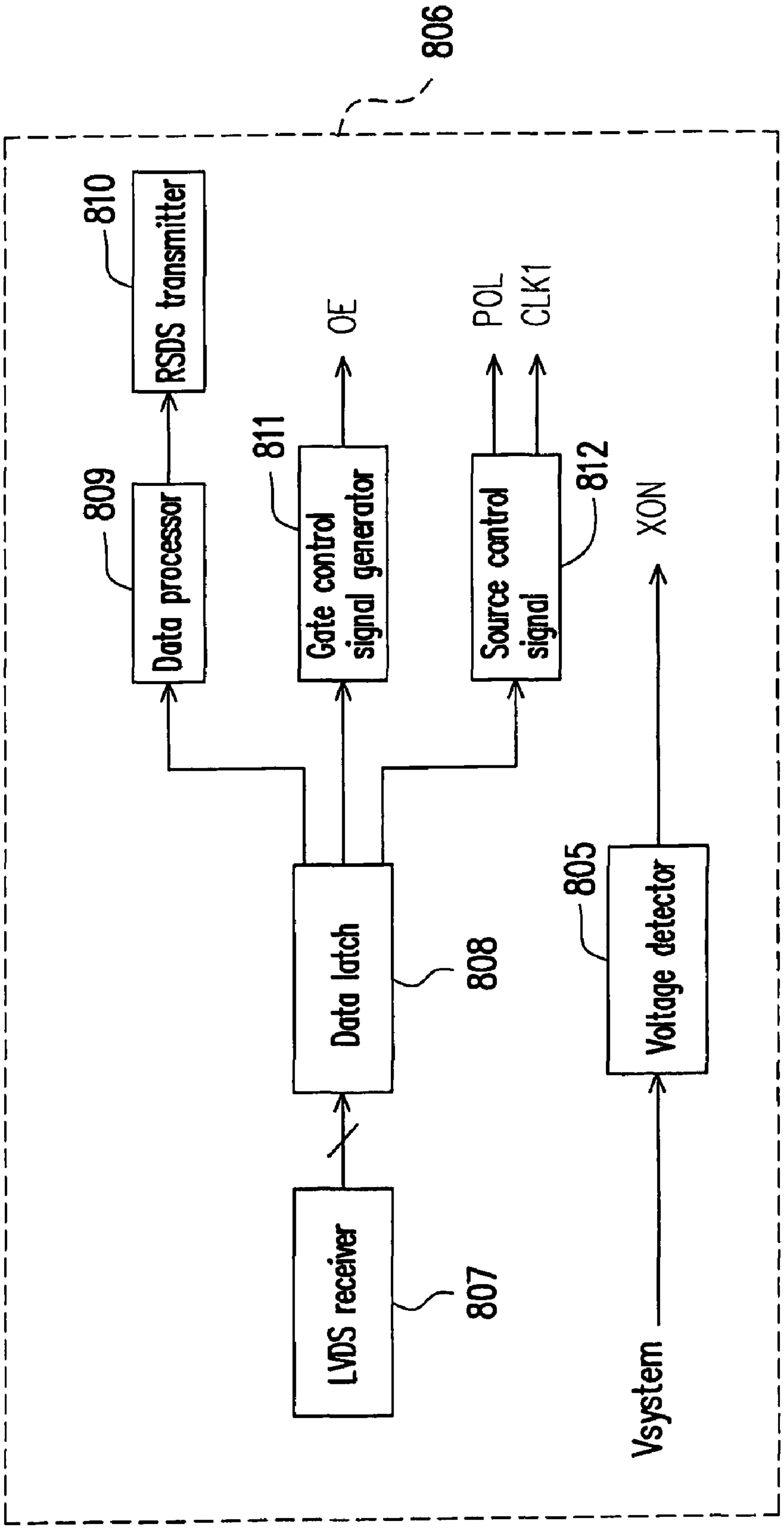
FIG. 8B is a block diagram illustrating an embodiment circuit of the timing controller of FIG. 8A.

FIG. 8B is a block diagram illustrating an embodiment circuit of the timing controller 806 of FIG. 8A. Referring to FIG. 8B, the operation of the low voltage differential signal (LVDS) receiver 807, the data latch 808, the data processor 809, the reduced swing differential signal (RSDS) transmitter 810, the gate control signal generation circuit 811, and the source control signal generation circuit 812 included in the timing controller 806 are acknowledged by those having ordinary knowledge in the art, therefore the repeated description will be omitted hereby. Moreover, the timing controller 806 includes a voltage detector 805. The voltage detector 805 detects the system voltage $V_{system}$, and generates a control signal XON for the source drivers 801*a*, 801*b* and 801*c* and the gate drivers 804*a*, 804*b* and 805*c* when the detected system voltage $V_{system}$ is less than a predefined voltage.

Figure 9A:
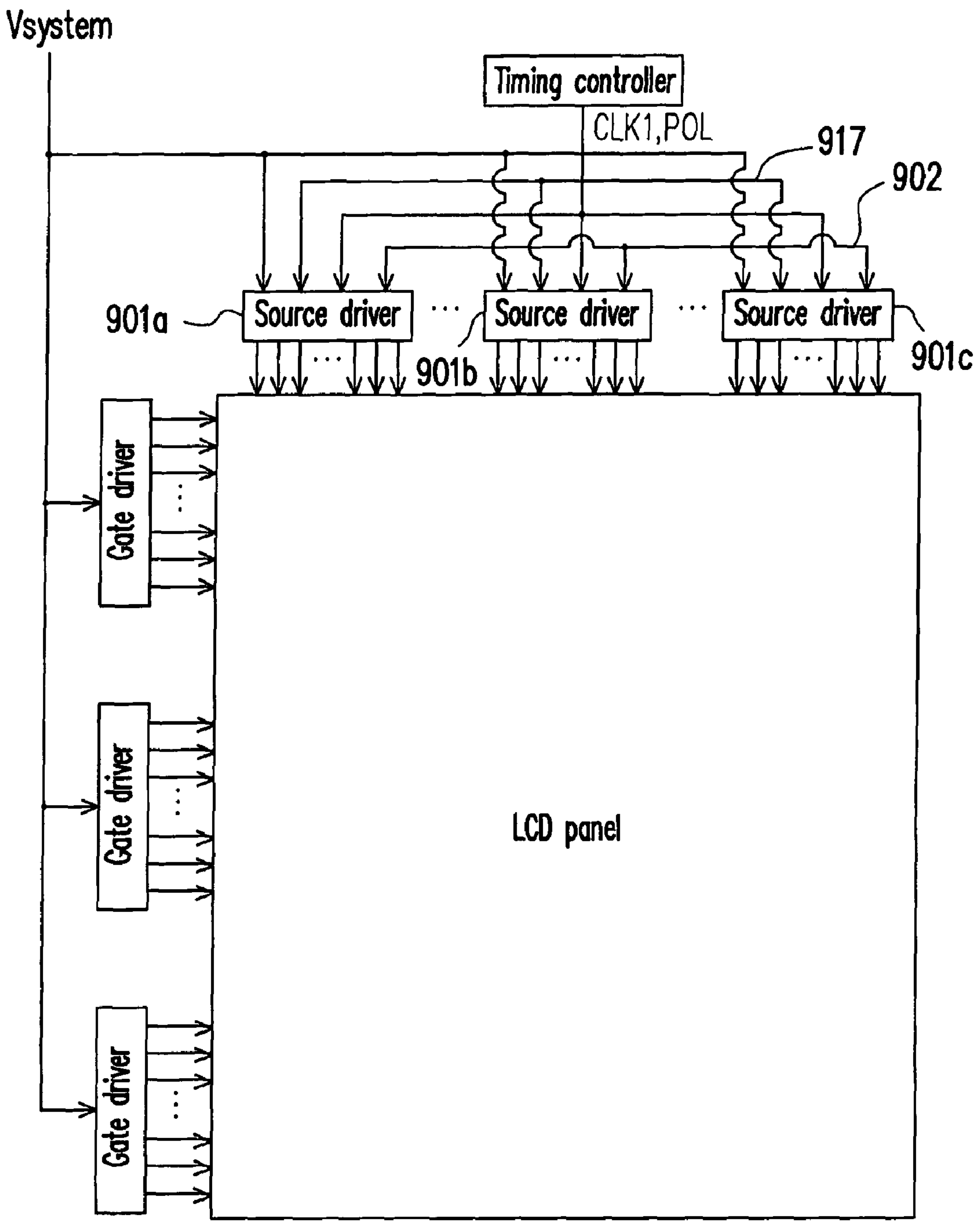
FIG. 9A is a block diagram of a display device according to a preferred embodiment of the present invention.
Figure 9B:
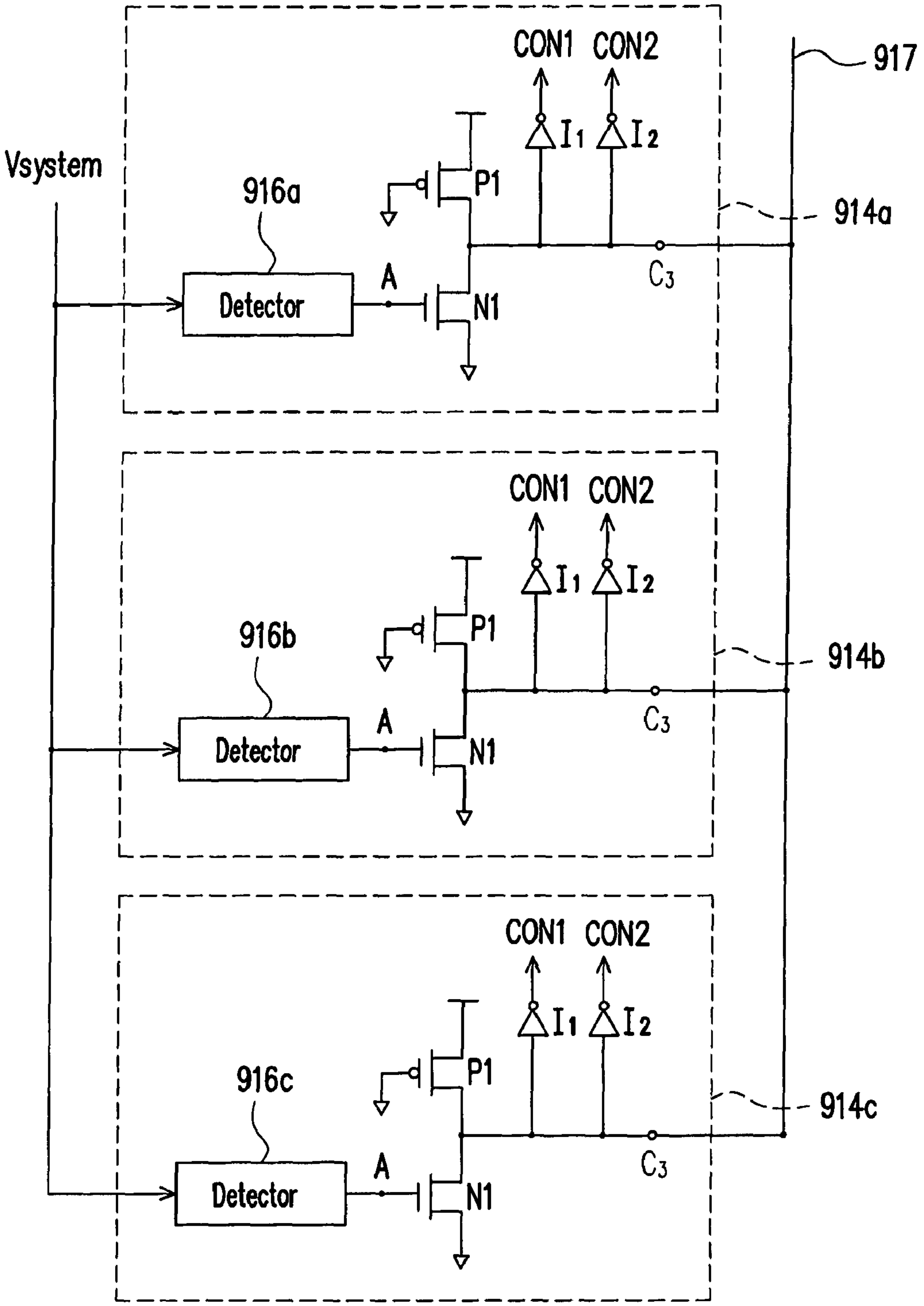
FIG. 9B is a block diagram illustrating an embodiment circuit of the signal generation circuits in the source drivers of FIG. 9A.

In addition, in the embodiments of FIGS. 6A and 7A, each signal generation circuit in a plurality of source drivers may detect the system voltage $V_{system}$, and may generate a first control signal and a second control signal in a different time, which may cause a block mura phenomenon during the display device being turned off. FIG. 9A is a block diagram of a display device according to a preferred embodiment of the present invention. FIG. 9B is a block diagram illustrating an embodiment circuit of the signal generation circuits in the source drivers of FIG. 9A. Referring to FIGS. 9A and 9B, in the present embodiment, the source drivers 901*a*, 901*b* and 901*c* respectively comprises a corresponding signal generation circuit 914*a*, 914*b* and 914*c* (only three source drivers are shown for illustration). A plurality of source drivers 901*a*, 901*b* and 901*c* are connected by connecting the third connecting terminals C3 of the signal generation circuit 914*a*, 914*b* and 914*c* through a second connecting line 917. Wherein the first connecting line 902 is coupled to all the second connecting terminals C2 of the switch modules in the source drivers 901*a*, 901*b* and 901*c*.

In the present embodiment, if the system voltage $V_{system}$ is less than a predefined voltage, a detector 916*a* in one of the signal generation circuits (e.g. signal generation circuit 914*a*) outputs an enable signal to elevate the potential of node A. However, turning on of a transistor N1 corresponding to a single source driver 914*a* is not enough to pull down the potential of the third connecting terminals C3 by which a plurality of source drivers is connected together. Only when the potential of nodes A of all the signal generation circuits in the source drivers are elevated, is it enough to pull down the potential of the third connecting terminals C3.

Accordingly, the first control signal CON1 and the second control signal CON2 in a plurality of source drivers can be transmitted in a same time, the problem of time inconsistency when a plurality of source drivers detecting the system voltage and sending control signals can be solved, such that the block mura phenomenon possibly occurs during the display device being turned off can be mitigated. Please refer to FIGS. 7A and 7B for the description of other operations of the circuit, the repeated description will be omitted hereby. Moreover, the embodiment shown in FIGS. 6A, 6B, 7A, 7B may have their source drivers connected in a way as that of the present embodiment (shown in FIGS. 9A and 9B).

Figure 10:
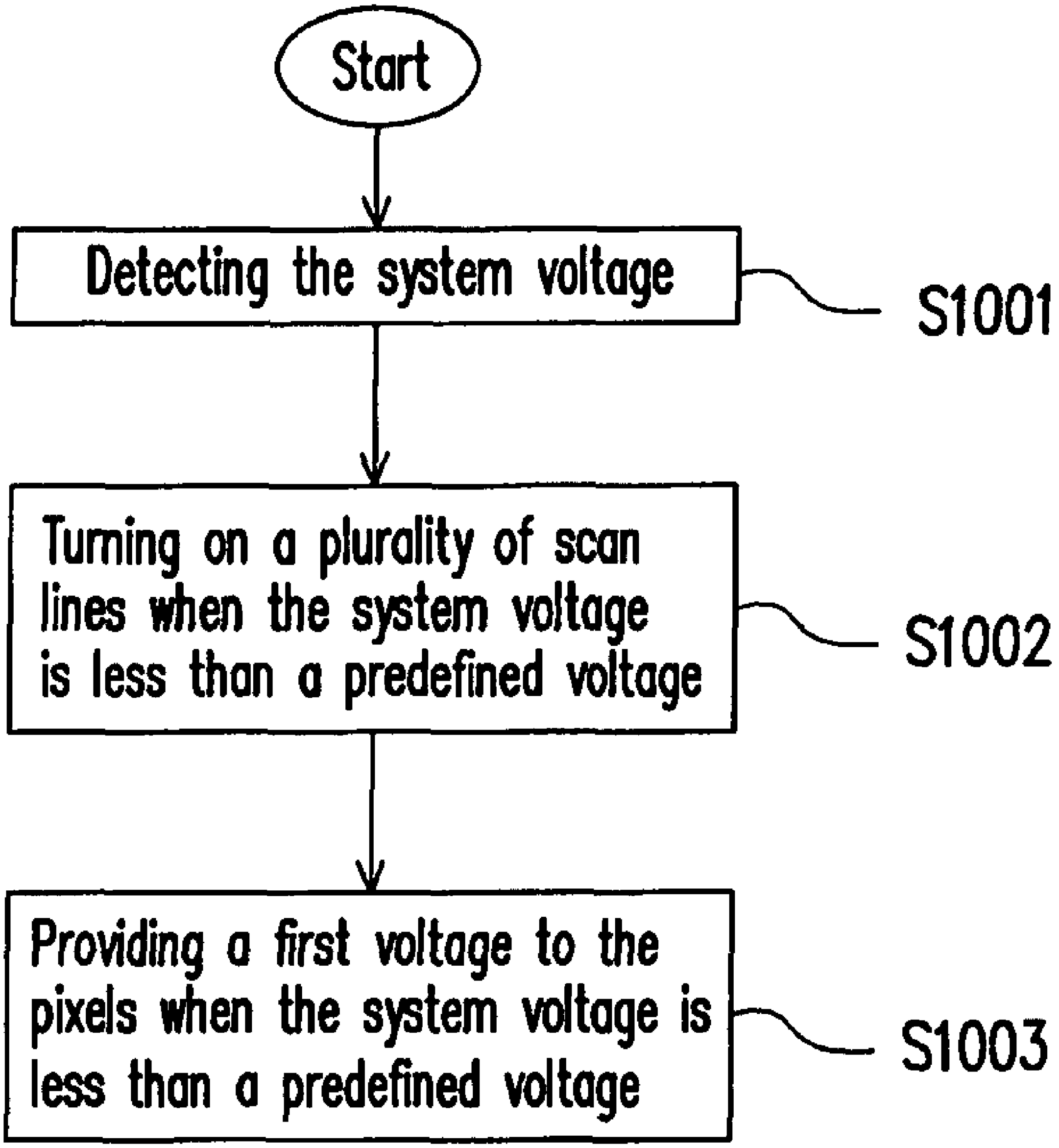
FIG. 10 is a flowchart of a control method for eliminating deficient display according to a preferred embodiment of the present invention.

In summary, based on the description of the aforementioned embodiments, a control method for eliminating deficient display comprises the following steps. FIG. 10 is a flowchart of a control method for eliminating deficient display according to a preferred embodiment of the present invention. Referring to FIG. 10, first, detecting a system voltage of the display device (step S1001). Next, if the detected system voltage is less than a predefined voltage, the gate drivers synchronously driving a plurality of scan lines of the display device to provide a discharge path for the discharge of the capacitors of the pixels or sub-pixels on the display panel (step S1002). Last, controlling the source drivers stop providing the pixel voltages to the pixels, and providing a first voltage to the pixels (step S1003), so as to avoid the block mura phenomenon caused by different discharge speed of the capacitors.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device for eliminating deficient display, comprising:

a display panel comprising a plurality of pixels;

a source driver providing a plurality of pixel voltages to the pixels; and a control device receiving a control signal, determining whether to provide a first voltage to the pixels, and determining the source driver whether to provide the pixel voltages to the pixels according to the control signal, wherein when a system voltage of the display device is less than a predefined voltage and the display device is in a turn-off state, the control device controls the source driver to stop providing the pixel voltages to the pixels, and provides a first voltage to the pixels, the control device comprising:

a plurality of switching modules, each switching module comprising:

a first output terminal receiving each pixel voltage outputted from the source driver;

a first connecting terminal coupled to each pixel;

a second connecting terminal;

a first switch turned on/off with the first output terminal according to a first control signal; and a second switch coupled to the first connecting terminal, turned on/off with the first switch or the second connecting terminal according to a second control signal;

a first connecting line coupled to the second connecting terminal of the switching modules, and coupled to the first voltage; and a signal generation circuit receiving the control signal, and generating the first control signal and the second control signal, wherein if the system voltage is less than the predefined voltage, the first switch is turned off in response to the first control signal, and the second switch is turned on to connect with the second connecting terminal in response to the second control signal.

2. The display device as claimed in claim 1, wherein the signal generation circuit comprises:

a detector, for detecting the system voltage, and outputting an enable signal when the system voltage being less than the predefined voltage;

a P-type transistor, with its gate coupled to a ground potential, and its first source/drain coupled to a power potential;

a N-type transistor, with its gate receiving the enable signal, its first source/drain coupled to a second source/drain of the P-type transistor, and its second source/drain coupled to the ground potential;

a first inverter, with its input terminal coupled to the first source/drain of the N-type transistor, and its output terminal outputting the first control signal; and a second inverter, with its input terminal coupled to the first source/drain of the N-type transistor, and its output terminal outputting the second control signal.

3. The display device as claimed in claim 2, wherein the signal generation circuit further comprises:

a third connecting terminal, coupled to the first source/drain of the N-type transistor.

4. The display device as claimed in claim 3, wherein the control device further comprises:

a second connecting line, coupled to the third connecting terminal.

5. The display device as claimed in claim 1 further comprising:

a voltage detector, for detecting the system voltage and generating the control signal.

6. The display device as claimed in claim 1 further comprising:

a gate driver receiving the control signal, and determining whether to drive a plurality of scan lines according to the control signal, wherein if the system voltage is less than the predefined voltage, the gate driver drives the scan lines.

7. The display device as claimed in claim 6, wherein the gate driver further comprises:

a voltage detector, for detecting the system voltage and generating the control signal.

8. A driving device for a display device, comprising:

a source driver providing a plurality of pixel voltages to the pixels of a display panel in the display device; and a control device receiving a control signal, determining whether to provide a first voltage to the pixels, and determining the source driver whether to provide the pixel voltages to the pixels according to the control signal, wherein when a system voltage of the display device is less than a predefined voltage and the display device is in a turn-off state, the control device controls the source driver to stop providing the pixel voltages to the pixels, and the control device provides a first voltage to the pixels, the control device comprising:

a plurality of switch modules, each switching module comprising:

a first output terminal receiving each pixel voltage outputted from the source driver;

a first connecting terminal coupled to each pixel;

a second connecting terminal;

a first switch turned on/off with the first output terminal according to a first control signal; and a second switch coupled to the first connecting terminal, turned on/off with the first switch or the second connecting terminal according to a second control signal;

a first connecting line coupled to the second connecting terminal of the switching modules, and coupled to the first voltage; and a signal generation circuit receiving the control signal, and generating the first control signal and the second control signal, wherein if the system voltage is less than the predefined voltage, the first switch is turned off in response to the first control signal, and the second switch is turned on to connect with the second connecting terminal in response to the second control signal.

9. The driving device as claimed in claim 8, wherein the signal generation circuit comprises:

a detector, for detecting the system voltage, and outputting an enable signal when the system voltage being less than the predefined voltage;
a P-type transistor, with its gate coupled to a ground potential, and its first source/drain coupled to a power potential;
a N-type transistor, with its gate receiving the enable signal, its first source/drain coupled to a second source/drain of the P-type transistor, and its second source/drain coupled to the ground potential;
a first inverter, with its input terminal coupled to the first source/drain of the N-type transistor, and its output terminal outputting the first control signal; and
a second inverter, with its input terminal coupled to the first source/drain of the N-type transistor, and its output terminal outputting the second control signal.

10. The driving device as claimed in claim 9, wherein the signal generation circuit further comprises:
a third connecting terminal, coupled to the first source/drain of the N-type transistor.

11. The driving device as claimed in claim 10, wherein the control device further comprises:
a second connecting line, coupled to the third connecting terminal.

12. The driving device as claimed in claim 8 further comprising:
a voltage detector, for detecting the system voltage and generating the control signal.

13. The driving device as claimed in claim 8 further comprising:
a gate driver receiving the control signal, and determining whether to drive a plurality of scan lines according to the control signal,
wherein if the system voltage is less than the predefined voltage, the gate driver drives the scan lines.

14. The driving device as claimed in claim 8, wherein the gate driver further comprises:
a voltage detector, for detecting the system voltage and generating the control signal.

* * * * *